(12) United States Patent
Chen et al.

(10) Patent No.: US 10,680,524 B2
(45) Date of Patent: Jun. 9, 2020

(54) FAST-CHARGING VOLTAGE GENERATOR

(71) Applicant: RichWave Technology Corp., Taipei (TW)

(72) Inventors: Chih-Sheng Chen, Taipei (TW); Tien-Yun Peng, Taipei (TW); Hsien-Huang Tsai, Taipei (TW)

(73) Assignee: RichWave Technology Corp., Taipei (TW)

( * ) Notice: Subject to any disclaimer, the term of this patent is extended or adjusted under 35 U.S.C. 154(b) by 0 days.

(21) Appl. No.: 16/290,975

(22) Filed: Mar. 4, 2019

(65) Prior Publication Data

US 2019/0199220 A1 Jun. 27, 2019

Related U.S. Application Data

(63) Continuation-in-part of application No. 15/398,726, filed on Jan. 5, 2017, now Pat. No. 10,270,349, which is a continuation of application No. 14/886,343, filed on Oct. 19, 2015, now Pat. No. 9,590,500.

(60) Provisional application No. 62/089,907, filed on Dec. 10, 2014.

(51) Int. Cl.
*H02M 3/24* (2006.01)
*H02M 1/36* (2007.01)
*H02M 7/10* (2006.01)
*H02M 3/07* (2006.01)

(52) U.S. Cl.
CPC .............. *H02M 3/24* (2013.01); *H02M 1/36* (2013.01); *H02M 3/07* (2013.01); *H02M 7/103* (2013.01); *H02M 2003/075* (2013.01)

(58) Field of Classification Search
None
See application file for complete search history.

(56) References Cited

U.S. PATENT DOCUMENTS

| | | |
|---|---|---|
| 5,208,557 A | 5/1993 | Kersh, III |
| 5,561,385 A | 10/1996 | Choi |
| 5,999,009 A | 12/1999 | Mitsui |
| 6,194,954 B1 | 2/2001 | Kim |
| 6,278,317 B1 | 8/2001 | Hsu |
| 6,737,907 B2 | 5/2004 | Hsu |
| 6,756,838 B1 | 6/2004 | Wu |
| 7,254,157 B1 | 8/2007 | Crotty |
| 8,344,790 B2 | 1/2013 | Li |
| 8,391,805 B2 | 3/2013 | Ishimori |
| 8,582,386 B2 | 11/2013 | Byeon |
| 8,587,363 B2 | 11/2013 | Otobe |
| 8,598,945 B2 | 12/2013 | Gorisse |
| 8,711,611 B2 | 4/2014 | Tsukada |

(Continued)

*Primary Examiner* — Lincoln D Donovan
*Assistant Examiner* — Khareem E Almo
(74) *Attorney, Agent, or Firm* — Winston Hsu

(57) ABSTRACT

A voltage generator includes an oscillator, a charge pump, a smoothing capacitor, and a driving controller. The oscillator has an output. The charge pump has an input and an output, and the input of the charge pump is coupled to the output of the oscillator. The smoothing capacitor is coupled to the output of the charge pump. The driving controller is coupled to the oscillator, and generates an enable signal to adjust an operation frequency of the oscillator. The voltage generator supplies a driving voltage to a switch for driving the switch via the smoothing capacitor. The driving controller generates the enable signal according to the driving voltage.

20 Claims, 16 Drawing Sheets

(56) References Cited

U.S. PATENT DOCUMENTS

| | | |
|---|---|---|
| 8,749,301 B2 | 6/2014 | Lin |
| 9,118,238 B2 * | 8/2015 | Liu .................. H02M 3/07 |
| 9,379,604 B2 | 6/2016 | Zhong |
| 2008/0024198 A1 * | 1/2008 | Bitonti .................. H02M 3/07 |
| | | 327/536 |
| 2010/0246859 A1 | 9/2010 | David |
| 2011/0109376 A1 * | 5/2011 | Li .................. H02M 3/073 |
| | | 327/536 |
| 2011/0309877 A1 | 12/2011 | Gorisse |
| 2013/0009725 A1 | 1/2013 | Heaney |
| 2013/0187698 A1 | 7/2013 | Otobe |
| 2014/0103982 A1 | 4/2014 | Lin |
| 2014/0210436 A1 | 7/2014 | Zhong |
| 2014/0354340 A1 | 12/2014 | Kadam |

* cited by examiner

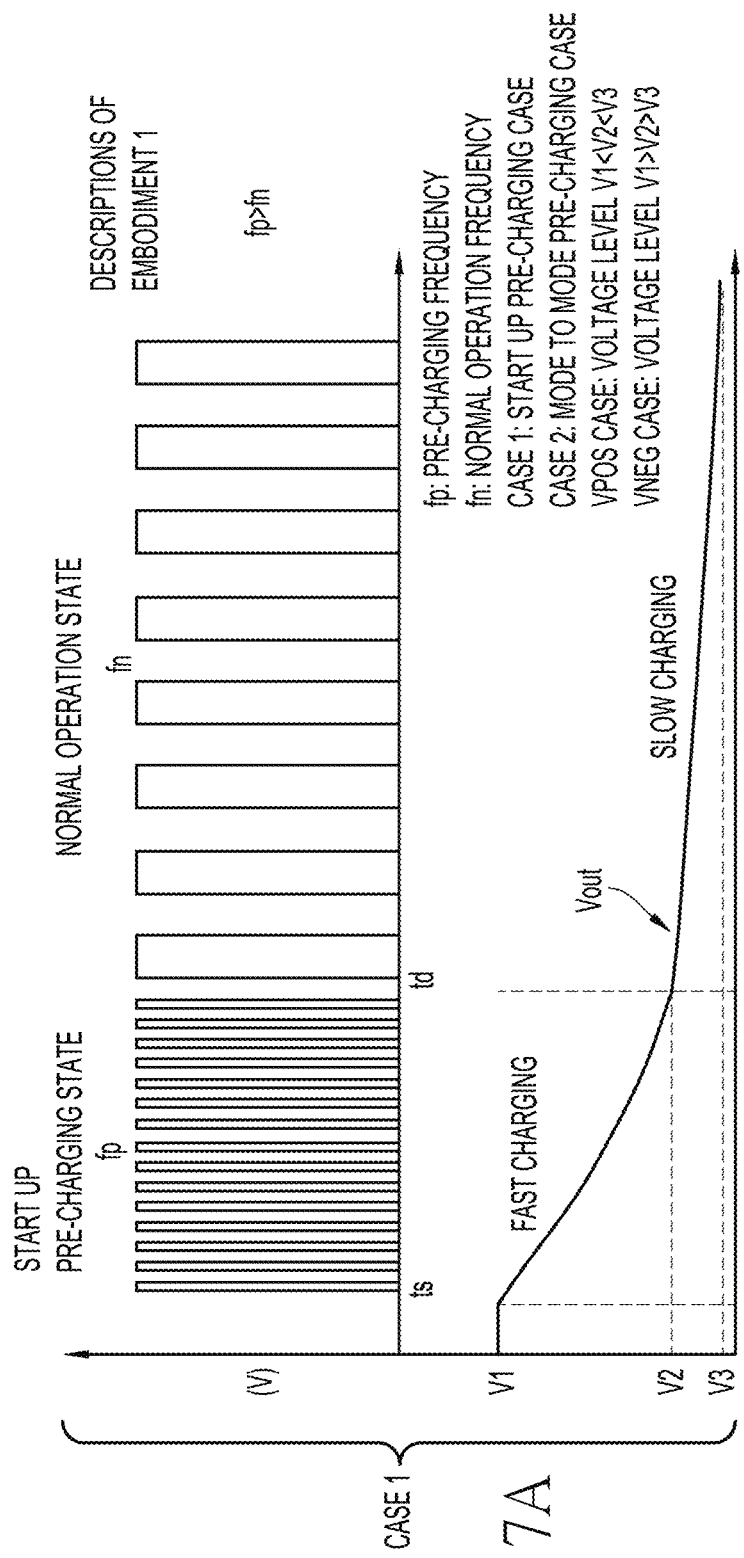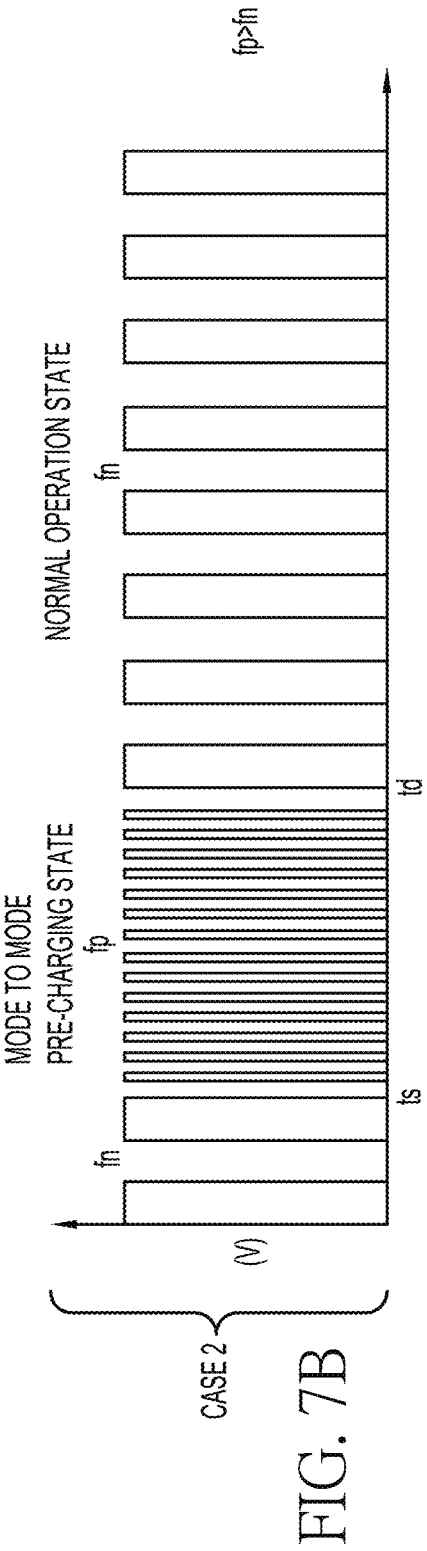
FIG. 7A
FIG. 7B

FAST-CHARGING VOLTAGE GENERATOR

CROSS REFERENCE TO RELATED APPLICATION

This application is a continuation-in-part of the prior application to Chen et al., application Ser. No. 15/398,726, filed Jan. 5, 2017, which is a continuation of the prior application to Chen et al., application Ser. No. 14/886,343, filed Oct. 19, 2015, which claims the benefit of U.S. Provisional Application No. 62/089,907, filed Dec. 10, 2014.

TECHNICAL FIELD

The present disclosure relates to voltage generators and, more specifically, to fast-charging voltage generators that may be employed to support associated circuitry.

BACKGROUND

Radio frequency (RF) switches are important building blocks in many wired and wireless communication systems. Solid state RF switches are found in many different communication devices such as cellular telephones, wireless pagers, wireless infrastructure equipment, satellite communications equipment, and cable television equipment. As is well known, the performance of a solid state RF switch may be characterized by one of any number of operating performance parameters including insertion loss and switch isolation. Performance parameters are often tightly coupled, and any one parameter can be emphasized in the design of RF switch components at the expense of others. Other characteristics that are important in RF switch design include ease and degree (or level) of integration of the RF switch, complexity, yield, return loss and, of course, cost of manufacture.

Still other performance characteristics associated with RF switches is power handling capability and switching speed. When the power handling capability of an RF switch is low, the RF switch might not be able to isolate one path from another if the input signal is too great. That is, the peak-to-peak voltage swing of an input signal might be sufficiently high to overcome the reverse bias of a given transistor or transistor group, thus effectively causing such a transistor or transistor group that has been placed in an OFF state (reverse bias state) to be in an undesirable ON state, and effectively ruin the switching capability of the RF switch. Switching speed is closely related to power handling in that if the speed of switching is not fast enough, a given switch path might not be isolated quickly enough and thus portions of received or transmitted signals might undesirably be present on selected branches of the switch.

SUMMARY

One embodiment of present invention discloses a voltage generator. The voltage generator includes an oscillator, a charge pump, a smoothing capacitor, and a driving controller.

The oscillator has an output. The charge pump has an input and an output, and the input of the charge pump is coupled to the output of the oscillator. The smoothing capacitor is coupled to the output of the charge pump. The driving controller is coupled to the oscillator, and generates an enable signal to adjust an operation frequency of the oscillator.

The voltage generator supplies a driving voltage to a switch for driving the switch via the smoothing capacitor. The driving controller generates the enable signal according to the driving voltage.

Another embodiment of present invention discloses a voltage generator. The voltage generator includes an oscillator, a charge pump, a smoothing capacitor, and a driving controller.

The oscillator has an output. The charge pump has an input and an output, and the input of the charge pump is coupled to the output of the oscillator. The smoothing capacitor is coupled to the output of the charge pump. The driving controller is coupled to the oscillator, and generates an enable signal to adjust an operation frequency of the oscillator.

The voltage generator supplies a driving voltage to a RF switch for driving the switch via the smoothing capacitor. During a switching period of the RF switch, the driving controller generates the enable signal according to the driving voltage so that the operation frequency of the oscillator is controlled to be faster.

Another embodiment of present invention discloses a voltage generator. The voltage generator includes an oscillator, a charge pump, a smoothing capacitor, and a driving controller.

The oscillator has an output. The charge pump has an input and an output, and the input of the charge pump is coupled to the output of the oscillator. The smoothing capacitor is coupled to the output of the charge pump. The driving controller is coupled to the oscillator, and generates an enable signal to adjust an operation frequency of the oscillator.

The voltage generator supplies a driving voltage to a circuit via the smoothing capacitor. The driving controller generates the enable signal according to the driving voltage.

BRIEF DESCRIPTION OF THE DRAWINGS

The present disclosure will become more readily apparent to those ordinarily skilled in the art after reviewing the following detailed description and accompanying drawings, in which:

FIGS. 7A and 7B are graphs showing pre-charging and normal operation states corresponding to fast and slow voltage charging periods in accordance with an embodiment of the present disclosure.

DETAILED DESCRIPTION

Figure 1A:
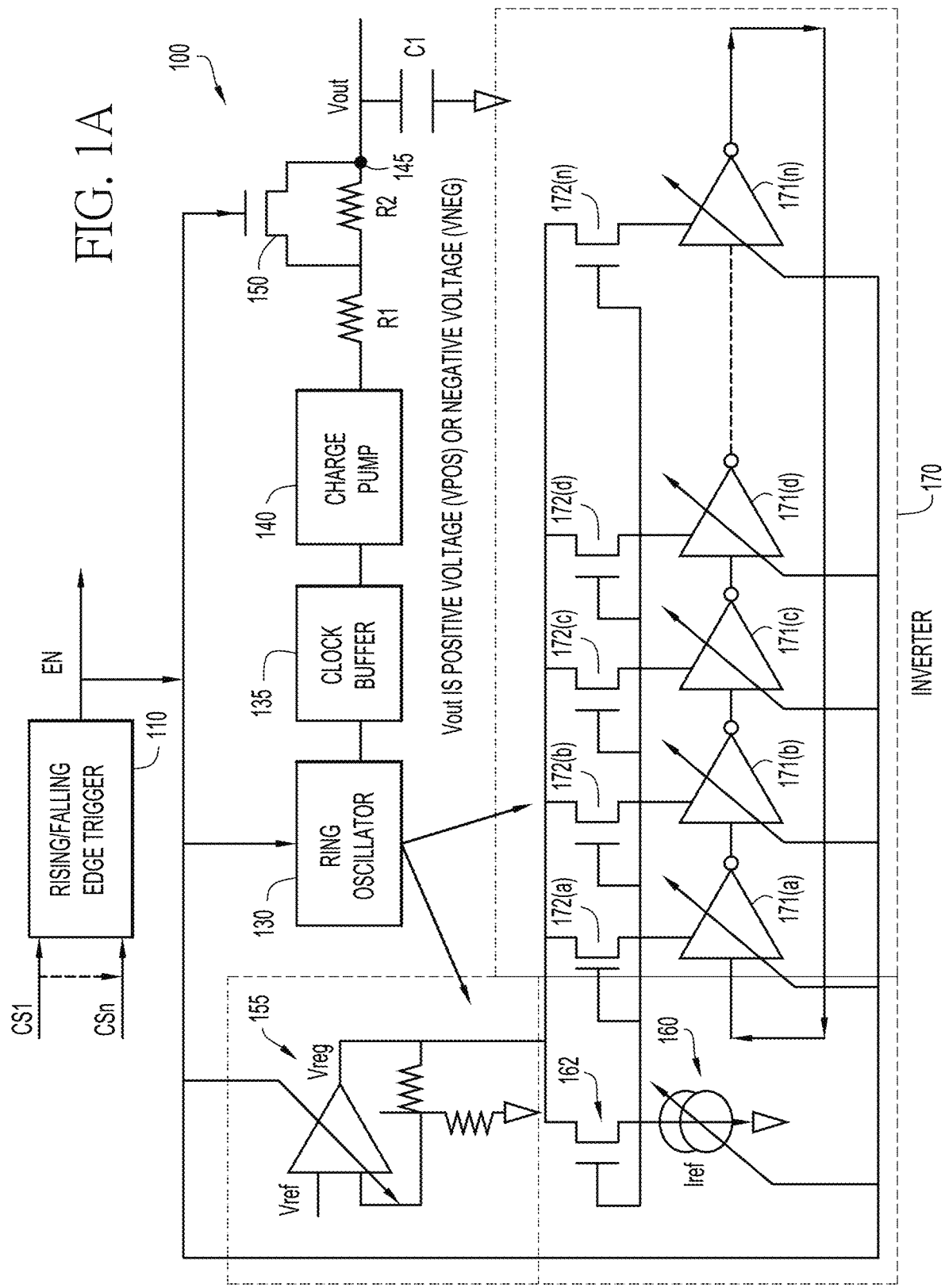
FIG. 1A depicts a block diagram of a voltage generator in accordance with a first embodiment of the present disclosure.

Below, exemplary embodiments will be described in detail with reference to accompanying drawings so as to be easily realized by a person having ordinary knowledge in the art. The inventive concept maybe embodied in various forms without being limited to the exemplary embodiments set forth herein. Descriptions of well-known parts are omitted for clarity, and like reference numerals refer to like elements throughout.

FIG. 1A depicts a block diagram of a voltage generator 100 in accordance with a first embodiment of the present disclosure. As shown, voltage generator 100 includes a rising/falling edge trigger 110 that is responsive to control signals CS1 . . . CSn, and that generates an enable signal EN according to a rising or falling edge of the control signals CS1 . . . CSn. As will be explained below with respect to FIGS. 8 and 9, control signals CS1 . . . CSn may be used as control signals to enable or disable respective branches of a radio frequency (RF) switch. As those skilled in the art will come to appreciate, the embodiments described herein improve the switching performance of such an RF switch.

As further shown in FIG. 1A, voltage generator 100 includes an oscillator 130, such as a ring oscillator, a clock buffer 135, a charge pump 140, a switchable shorting element (e.g., a transistor) 150, a first resistor R1 (i.e., an additional resistor) and a second resistor R2 (i.e., a resistor) connected in series and connected between an output of the charge pump 140 and a smoothing capacitor C1. The node 145 connecting second resistor R2 and one side of smoothing capacitor C1 is designated as Vout and is the output that supplies a desired voltage to gates of respective transistors that control whether a given path of an RF switch is enabled or disabled (as will be described more fully with respect to FIGS. 8 and 9). Vout could be a positive voltage (VPOS) or a negative voltage (VNEG). In an alternative embodiment, clock buffer 135 could be replaced by a rail-to-rail amplifier, or be eliminated (shown in FIG. 1B). Switchable shorting element 150 is connected in parallel with second resistor R2 and which, when turned on, causes second resistor R2 to be bypassed or shorted, thereby reducing the RC constant made up of first and second resistors R1, R2 and smoothing capacitor C1. Further operational details of switchable shorting element 150 are described later herein.

Ring oscillator 130 is comprised of a regulated voltage generator 155 that generates regulated voltage Vreg, a bias current generator 160 that generates a bias current Iref, and an inverter module 170 made up of a plurality of inverters 171(*a*)-171(*n*).

Each of the inverters 171(*a*)-171(*n*) is powered by a respective transistor 172(1)-172(*n*) with regulated voltage generator 155 and bias current generator 160 providing the desired voltage and current thereto. Gate voltage for transistors 172(1)-172(*n*) is generated by Iref and transistor 162, which is operated in its saturation region. Thus, the gate voltage equals Vreg–VGS (for transistor 162).

As further shown, enable signal EN is supplied to switchable shorting element 150 and to oscillator 130, and thus also to regulated voltage generator 155, bias current generator 160 and inverter module 170. The result of the application of the enable signal will be described in further detail below. In one embodiment, rising falling edge trigger 110 generates enable signal EN for a predetermined period of time, e.g., approximately 2 μsec, by use of, e.g. a delayer circuit (shown in FIG. 8). That is, enable signal EN may be considered a momentary signal for purposes of assisting an RF switch to change from a start up mode to a normal operational mode, or to change from one mode to another mode during normal operations.

Figure 1B:
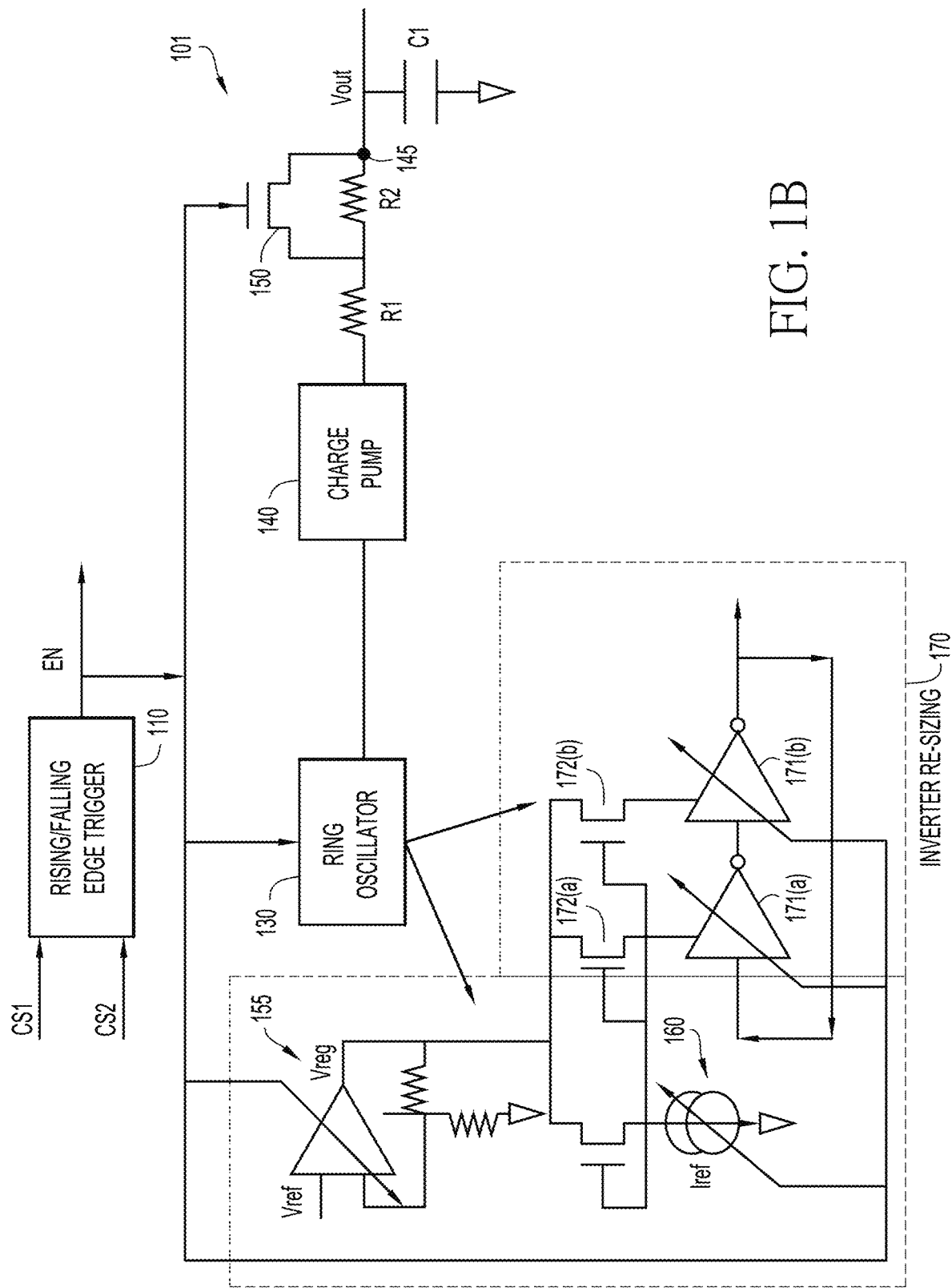
FIG. 1B depicts a block diagram of a voltage generator in accordance with a second embodiment of the present disclosure.

FIG. 1B depicts a block diagram of a voltage generator 101 in accordance with a second embodiment of the present disclosure. As shown, voltage generator 101 includes rising/falling edge trigger 110 that is responsive to control signals CS1 and CS2, and that generates enable signal EN according to a rising or falling edge of the control signals CS1, CS2. In this embodiment, the input of charge pump 140 is coupled to the output of the oscillator 130 (i.e., without intervening clock buffer 135 as shown in FIG. 1A). Other than the removal of clock buffer 135, the main difference between voltage generator 100 in FIG. 1A and voltage generator 101 in FIG. 1B is that inverter module 170 comprises at least two inverters 171(*a*) and 171(*b*). As will be explained below, enable signal EN controls the sizing of inverter module 170, i.e., enable signal EN is employed to select transistors with different gate sizes, thereby influencing the frequency of oscillator 130.

Figure 9:
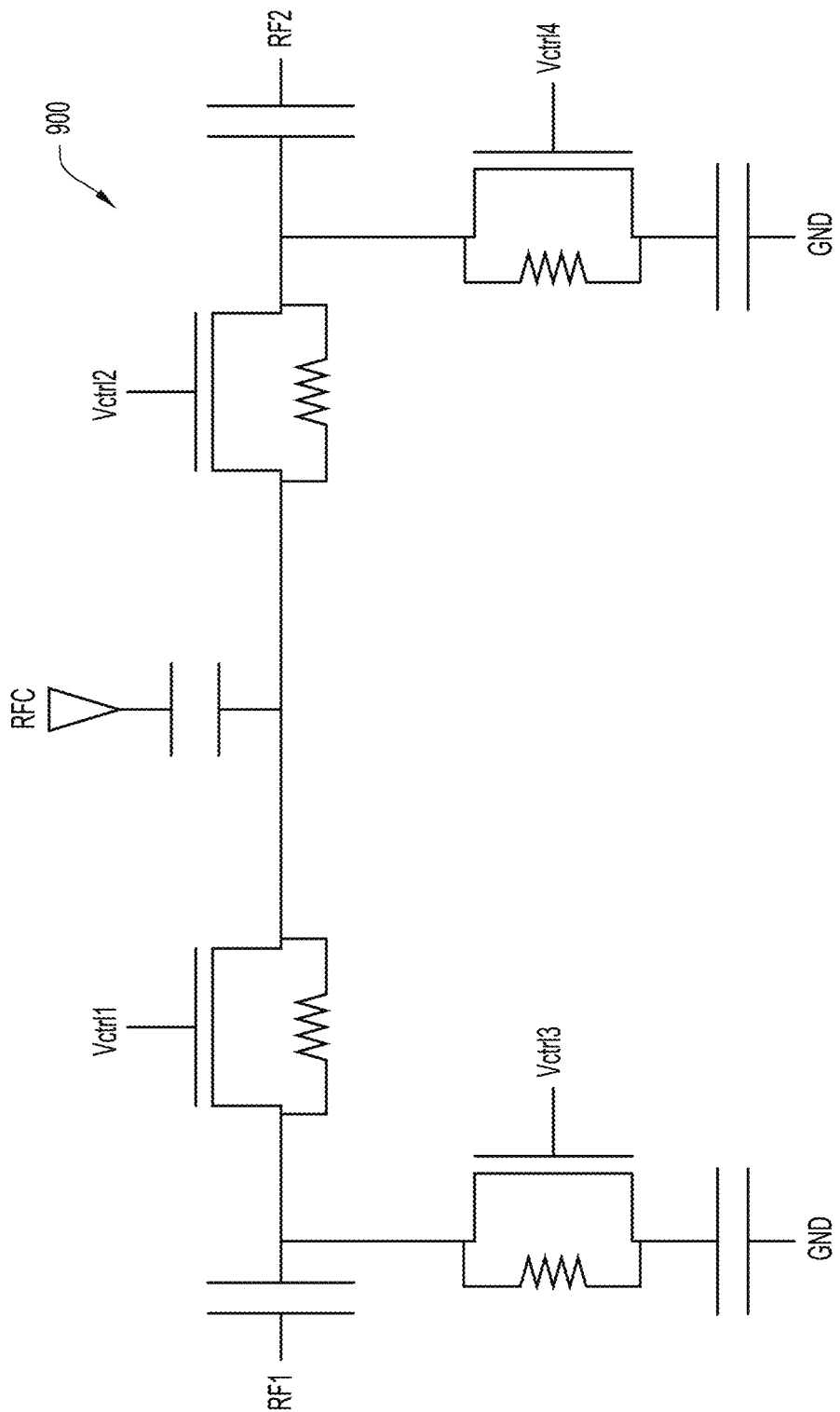
FIG. 9 depicts a radio frequency (RF) switch that can be controlled to operate in accordance with the fast and slow charging periods in accordance with an embodiment of the present disclosure.

A goal of embodiments of the present disclosure is to quickly charge smoothing capacitor C1 to a desired voltage, which may then be available for use to, e.g., forward or reverse bias a switching element in another component of an overall circuit (e.g., as shown in FIG. 9). That is, it may be desirable to have a higher (or lower)-than-nominal voltage available for a variety of purposes, and sometimes it is particularly helpful to be able to generate such a voltage very quickly.

More specifically, in accordance with embodiments of the present disclosure, voltage generator 101 (as an example) operates in two states. In a first, fast or pre-charging, state, the voltage generator operates to quickly charge smoothing capacitor C1 to an intermediate voltage that is sufficiently high or low for selected applications, and in a second, slow charging, state, the voltage generator operates to reduce noise and to further charge the smoothing capacitor to a lower negative voltage when Vout is a negative voltage (VNEG), or to a higher positive voltage when Vout is a positive voltage (VPOS).

In one embodiment, as shown in FIGS. 7A and 7B, in the first, fast charging, state, smoothing capacitor C1 is charged to V2 (e.g., 0.9*V3) from V1 in 2 microseconds (the period of enable signal EN), and in the second, slow charging, state, smoothing capacitor C1 is charged further to V3.

To achieve the different states, the enable signal EN is selectively generated/applied when the first, fast charging, state is desired. That state, as noted, may last on the order of 2 microseconds. The default state, maybe considered the second, slow charging, state.

The generated enable signal EN may be applied to one or more of several components that enable voltage generator 101 (or 100) to generate the desired voltage within the desired timeframe.

Figure 2:
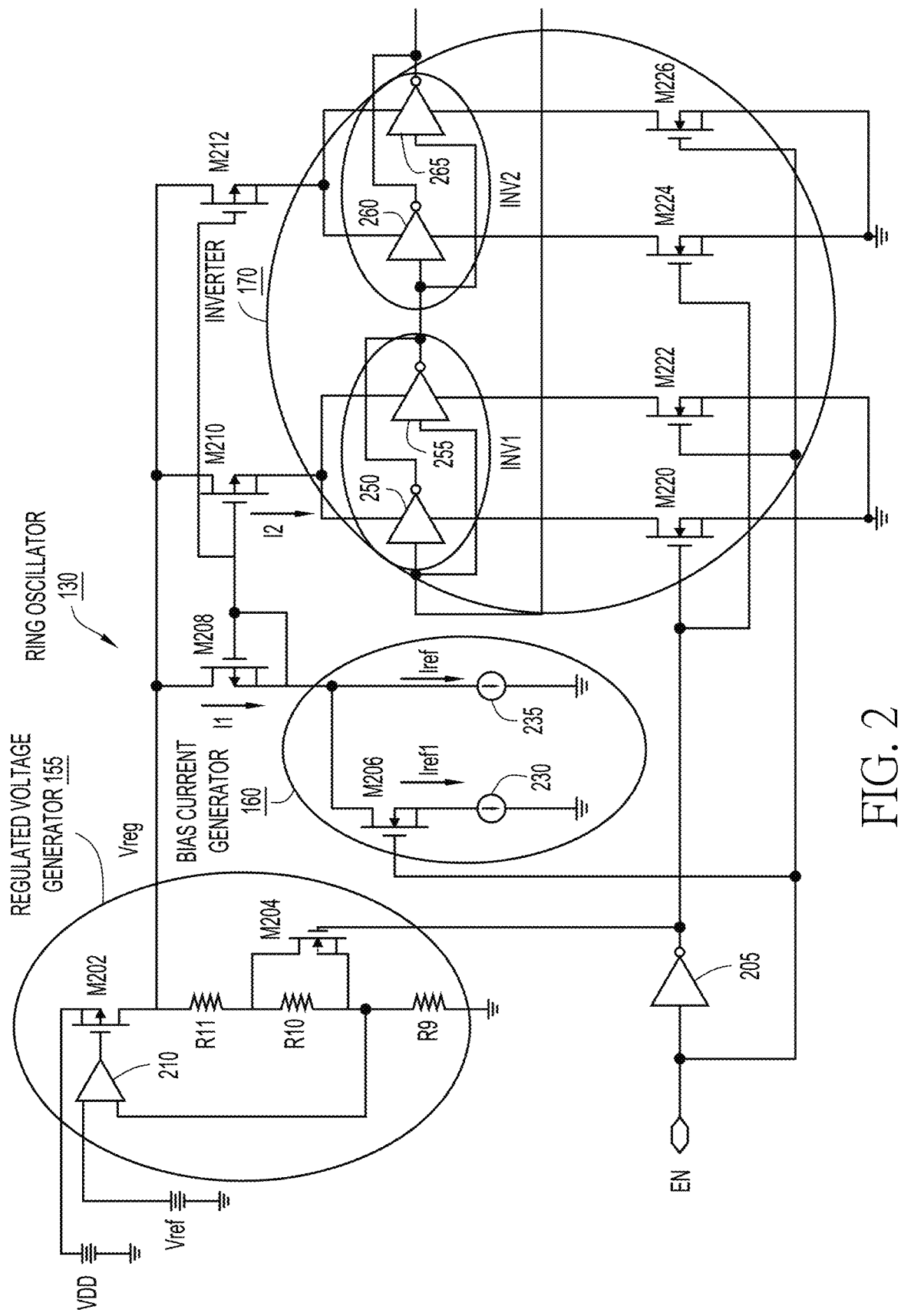
FIG. 2 depicts more details of several components shown in FIGS. 1A and 1B in accordance with an embodiment of the present disclosure.

FIG. 2 depicts more details of the several components shown in FIG. 1B in accordance with an embodiment of the present disclosure. Those skilled in the art will appreciate that the details shown in FIG. 2 are exemplary only, and are not meant to be limiting in any way. Other implementations are possible as those skilled in the art will appreciate.

In FIG. 2, regulated voltage generator 155 comprises series connected resistors R9, R10 and R11 that provide a path to ground for VDD via transistor M202. A reference voltage Vref is used as one input to an opamp 210 whose other input is supplied from the node between resistors R9 and R10. Transistor M204 controls whether resistor R10 is bypassed or not. That is, upon the application of enable signal EN via inverter 205, resistor R10 is placed back in series with R9 and R11 thereby increasing the voltage of Vreg.

As noted, embodiments of the present invention provide a fast charging state and a slow charging state. In the fast charging state (or pre-charging state):

EN' (invert of EN)=Low $Vreg=Vref\times[1+(R11+R10)/R9]$

In the slow charging state:

EN' (invert of EN)=High $Vreg=Vref\times[1+(R11/R9)]$

Vreg (Pre-charging state, Vreg1)>Vreg (Normal operation state, Vreg2)

A higher Vreg results in a higher frequency for oscillator 130.

Figure 3:
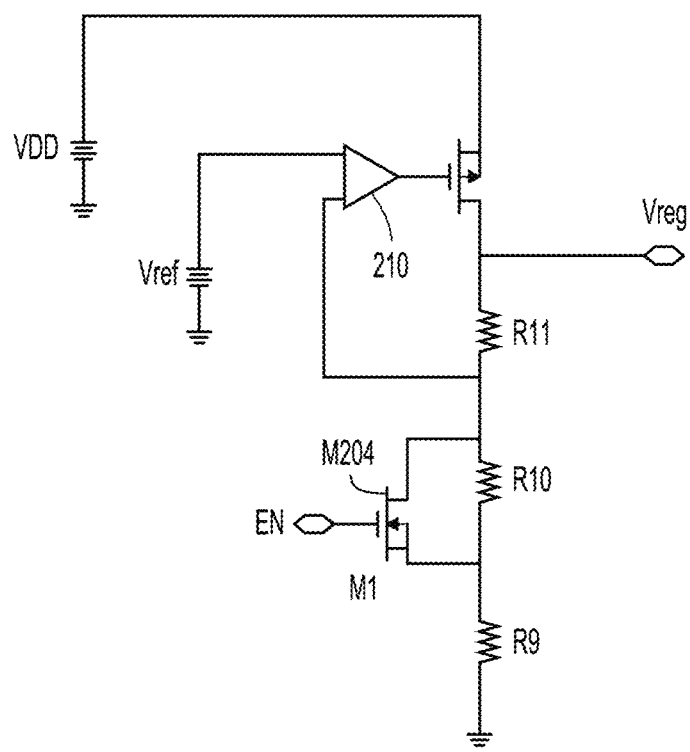
FIG. 3 is a schematic diagram of another embodiment of a regulated voltage generator of a ring oscillator in accordance with an embodiment of the present disclosure.

FIG. 3 depicts another possible embodiment for regulated voltage generator 155. In this case, a non-inverted version of enable signal EN is employed, and an input to op-amp 210 is from a node between R10 and R11.

Thus, in the embodiment of FIG. 3, in the fast charging state/Pre-charging state:

EN=High $Vreg=Vref\times[1+(R11/R9)]$

In the slow charging/normal operation state:

EN=Low $Vreg=Vref\times[1+(R11/(R9+R10))]$

Thus, and referring again to FIG. 2, when the enable signal EN is high, inverter 205 inverts the high enable signal EN and turns off M204. This, in turn, places resistor R10 in the circuit resulting in an increased Vreg regulated voltage. This regulated voltage is supplied to the bias current generator 160 and to the several inverters 171(1), etc. of ring oscillator 130. By increasing the regulated voltage, the frequency of ring oscillator 130 increases, thereby more quickly achieving the fast charge over the course of, e.g., the predetermined 2 microsecond fast charging period.

Still referring to FIG. 2, bias current generator 160 is comprised of transistor M206 and current sources 230 and 235. Voltage Vreg is supplied through transistor M208. Enable signal EN is used to control transistor M206.

In this configuration of bias current generator 160, in the fast charging state/Pre-charging state:

EN=High, M206 is turn ON

I1=Iref+Iref1, I2 (to inverter)=I1

In the slow charging state/Normal operation state:

EN=Low, M206 is turned Off

I1=Iref, I2 (to inverter)=I1

Thus, as shown, in the first state, the high enable signal EN is supplied to transistor M206, which adds an additional bias current designated as Iref1 to the circuit. The higher bias current resulting from the application of the high enable signal EN causes an increase of the frequency of ring oscillator 130, which results in the desired fast charging state.

Referring back to FIG. 1B and still to FIG. 2, inverter module 170 is comprised of, in this example embodiment, inverters INV1 and INV2. Inverter INV1 is comprised of inverters 250, 255, transistor M210 via which Vreg is supplied, and transistors M220 and M222. Inverter INV2 is comprised of inverters 260, 265, transistor M212 via which Vreg is supplied, and transistors M224 and M226.

Figure 4:
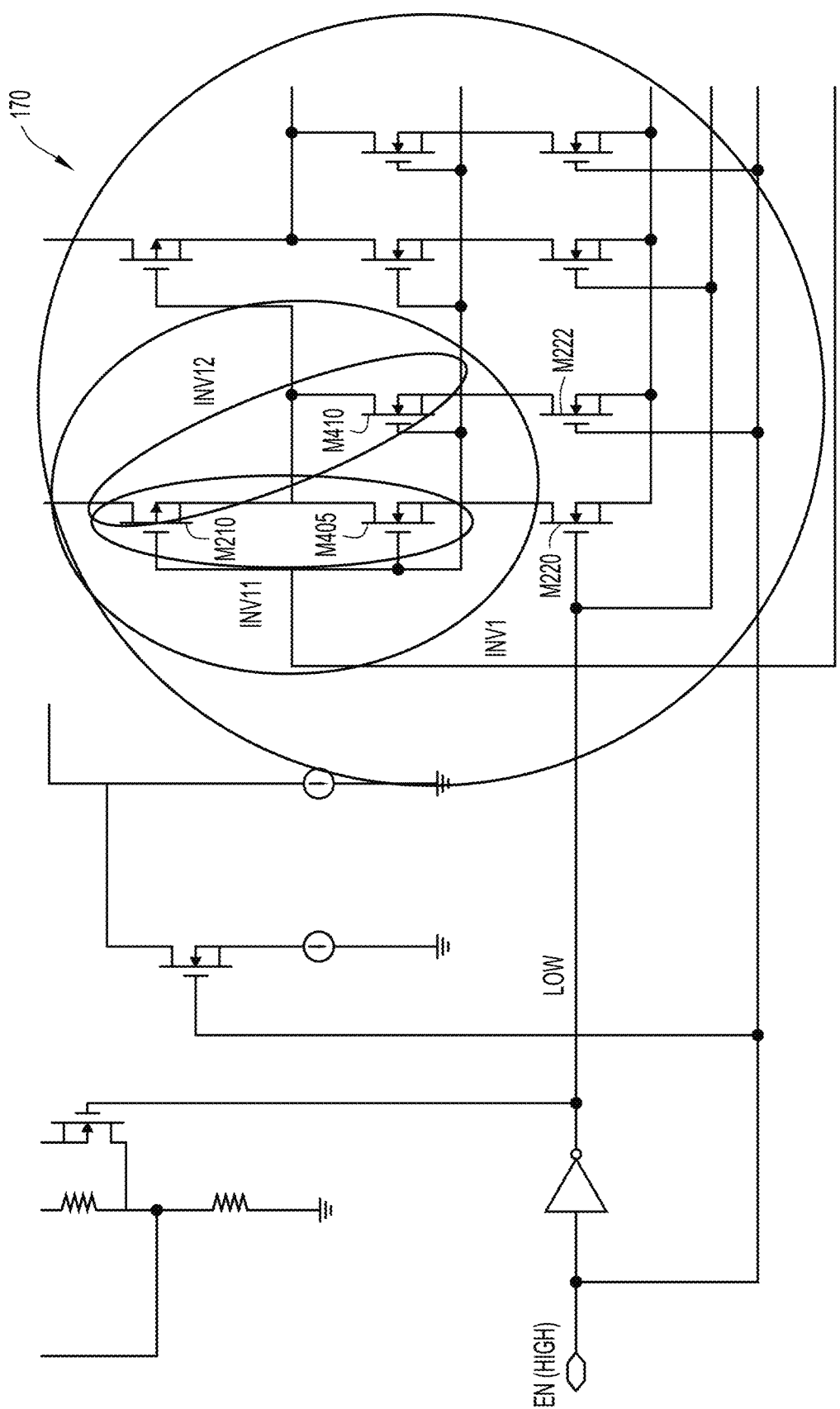
FIG. 4 is a schematic diagram of an inverter component of a ring oscillator in accordance with an embodiment of the present disclosure.

FIG. 4 is a more detailed depiction of inverter module 170 and further shows how INV1, for example, is comprised of INV11 comprising transistor M405 and INV12 comprising transistor M410. As shown, enable signal EN is supplied to transistor M222 and an inverted form of enable signal EN is supplied to transistor M220. In the first state, enable signal EN is high. Thus, transistor M222 is turned on and transistor M220 is turned off so that transistor M410 is active and transistor M405 is inactive. In this configuration, a first-second inverter INV12, formed by at least one PMOS transistor M210 and at least one NMOS transistor M410, is enabled for oscillator 130 operation. In one embodiment, the effective gate length L of the first inverter INV1 is resized to 0.18 μm, i.e., the gate length of M410.

In the second state, i.e., the slow charging state, the enable signal EN is low. Thus, transistor M222 is turned off and transistor M220 is turned on so that transistor M410 is inactive and transistor M405 is active. In this configuration, a first-first inverter INV11, formed by at least one PMOS transistor M210 and at least one NMOS transistor M405, is enabled for oscillator 130 operation. In one embodiment, the effective gate length L of the first inverter INV1 is resized to 5 μm, i.e., the gate length of M405. With a smaller gate length, the frequency of the ring oscillator 130 is increased thereby achieving the desired fast charging when the enable signal EN is high. In another embodiment, NMOS transistor M405 could be designed with a smaller gate width and NMOS transistor M410 could be designed with larger gate width.

Figure 5A:
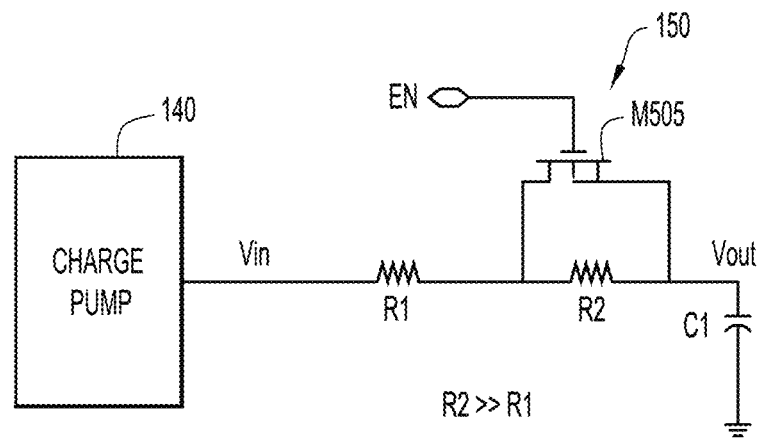
FIGS. 5A-5C are schematic diagrams including a switchable shorting element in accordance with embodiments of the present disclosure.

Reference is now made to FIG. 5A, which is a schematic of switchable shorting element 150 used in voltage generator 100 or 101 in accordance with an embodiment of the present disclosure. As shown, switchable shorting element 150 comprises transistor M505. When a high enable signal EN is applied to transistor M505 it is turned on, thus shorting the second resistor R2. In the second, slow charging, state, transistor M505 is turned off thus forcing resistor R2 back into the circuit, and increasing the RC constant in connection with the smoothing capacitor C1.

Thus, in the fast charging state/Pre-charging state:

$$V\text{out}=V\text{in}\times(1-e^{-t/R1C})$$

In the slow charging state/Normal operation state:

$$V\text{out}=V\text{in}\times[1-e^{-t/(R1+R2)C}]$$

Figure 5B:
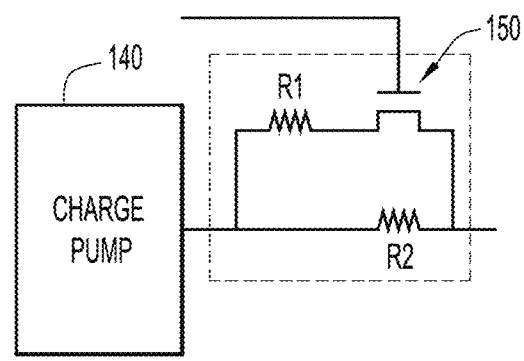
Figure 5C:
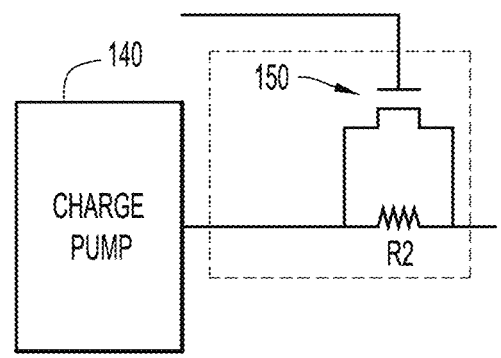

FIG. 5B shows a different configuration wherein resistor R1 is coupled between a node, defined by a connection between the resistor R2 and charge pump 140, and switchable shorting element 150. The configuration of FIG. 5C is similar to that shown in FIG. 5A, but resistor R1 is eliminated.

Figure 6A:
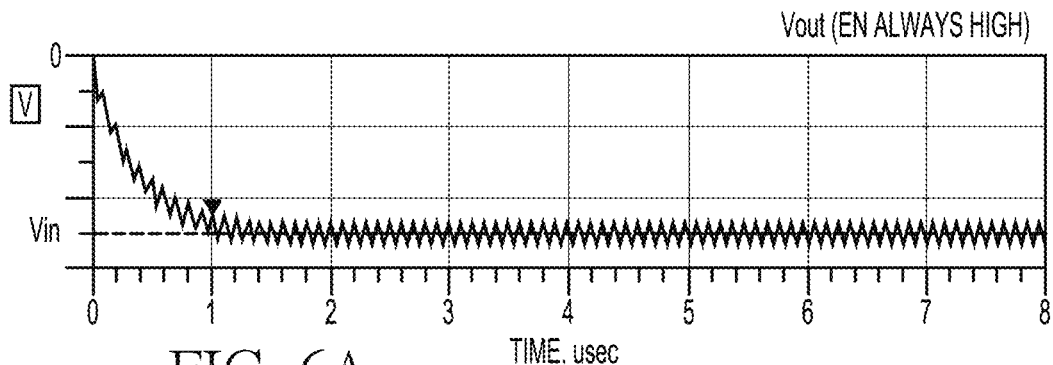
FIGS. 6A-6D are graphs showing the effects of the application of an enable signal in accordance with an embodiment of the present disclosure.
Figure 6B:
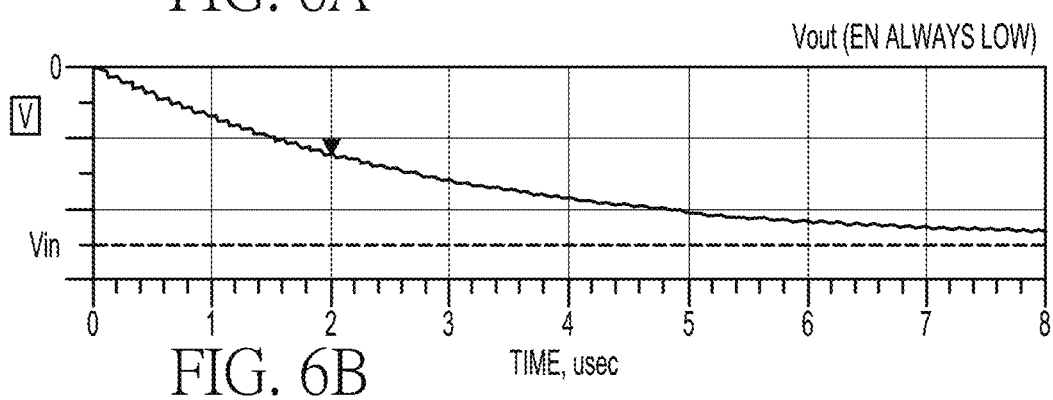

FIGS. 6A and 6B depict, respectively, graphs of Vout if enable signal EN is kept high indefinitely, or is never applied at all.

Figure 6C:
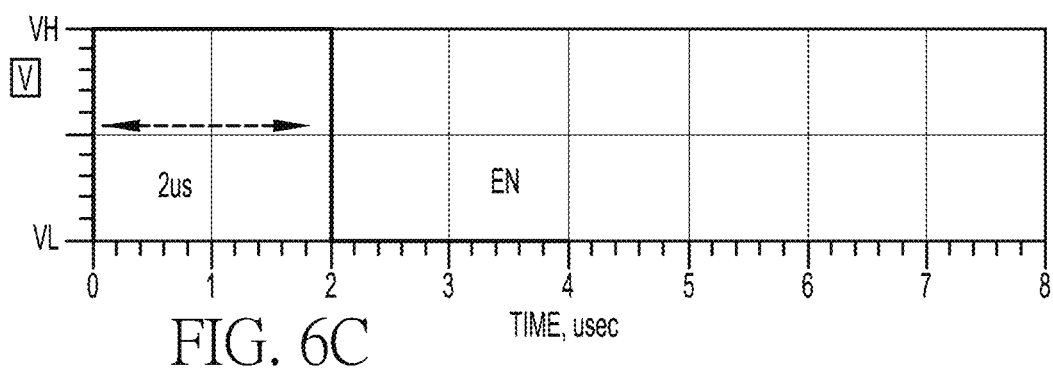
Figure 6D:
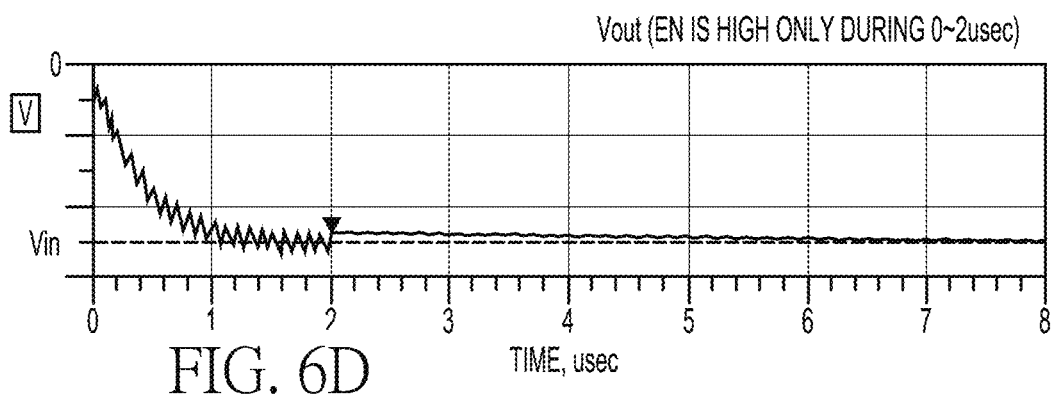

FIG. 6C shows the application of enable signal EN for approximately 2 μsec, and FIG. 6D shows that the desired Vout is quickly obtained, and becomes stable almost immediately compared to the graph of FIG. 6A.

FIGS. 7A and 7B are graphs showing fast, pre-charging (first state) and normal operation (second state) states corresponding to fast and slow voltage charging periods in accordance with an embodiment of the present disclosure.

The graph of FIG. 7A depicts an instance when, e.g., an electronic device is first powered on and an RF switch, for example, will be used for the first time. Such an instance may be considered a start-up or pre-charging state. The graph of FIG. 7B depicts an instance when, after the electronic device is in operation, there is a need to change which path of an RF switch is enabled.

In FIGS. 7A and 7B "fp" connotes the pre-charging or mode-to-mode frequency of oscillator 130, and "fn" connotes the normal frequency, where fp>fn. The indicated ts and td markings denote the beginning and end times of enable signal EN.

Figure 8:
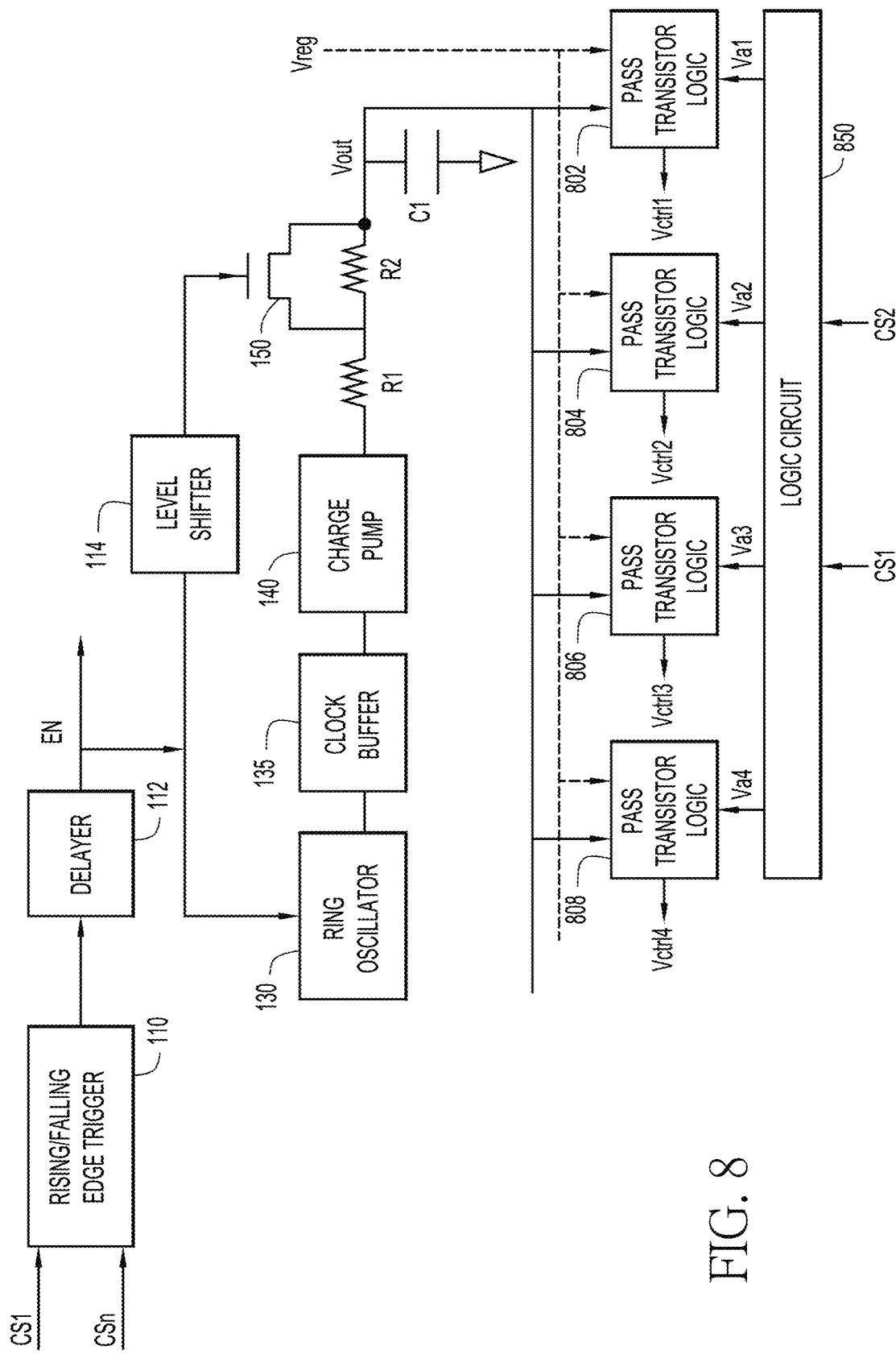
FIG. 8 depicts control logic that is employed to operate an RF switch like that shown in shown in FIG. 9 in accordance with an embodiment of the present disclosure.

FIG. 8 depicts control logic that is employed to operate an RF switch like that shown in shown in FIG. 9. FIG. 8 depicts rising/falling edge trigger 110, which receives as inputs control signals CS1 and CS2, a delayer 112, a level shifter 114, oscillator 130, clock buffer 135, charge pump 140 and switchable shorting element 150, along with resistors R1 and R2. Delayer 112 operates to ensure that enable signal EN is kept high for the desired 2 μsec, or other desired period of time to effect to fast charging mode as described herein. Level shifter 114 may be employed to adjust the applied voltage to a gate terminal of the transistor that may be employed for switchable shorting element 150.

As can be seen in FIG. 8 Vreg and Vout are supplied to pass transistor logic circuits 802, 804, 806 and 808. These logic circuits are responsible for supplying as outputs, either Vreg or Vout. Outputs are supplied as Vctrl1, Vctrl2, Vctrl3, and Vctrl4, which are supplied to gates of transistors in RF switch 900 of FIG. 9 having an RF common (RFC) terminal, and two input/output terminals RF1, RF2.

Which voltage, Vreg or Vout is applied to respective Vctrl1, Vctrl2, Vctrl3, and Vctrl4 outputs is dictated by logic circuit 800 using as inputs CS1 and CS2, the same inputs that are monitored for rising and falling edges to trigger enable signal EN generation. In other words, as the states of CS1 and CS2 change, that change will be detected by rising/falling edge trigger 110 causing enable signal EN to be applied for, e.g., the 2 μsec period. At the same time, logic circuit 800 will determine which voltage, Vreg or Vout, should be applied to Vctrl1, Vctrl2, Vctrl3, and Vctrl4, and thus to gates of respective transistors, as this will determine which paths of RF switch 900 will be enabled. That is, Vctrl1 dictates whether the path between RF1 and RFC is enabled, Vctrl2 dictates whether the path between RF2 and RFC is enabled, Vctrl3 dictates whether a shunt path associated with RF1 is enabled, and Vctrl4 dictates whether a shunt path associated with RF2 is enabled.

By applying the enhanced Vout (i.e., lower negative or higher positive voltage compared to Vreg) for a selected amount of time via Vctrl1, Vctrl2, Vctrl3, and Vctrl4, it is possible to more quickly cause RF switch 900 to enable or disable paths.

Those skilled in the art will appreciate that while the embodiments of the voltage generator 100, 101 have been described in connection with an RF switch, voltage generator 100, 101 can also be used in connection with a power amplifier, a low noise amplifier, a transceiver, a PLL or a frequency synthesizer, among other possible circuits, devices or components.

Figure 10:
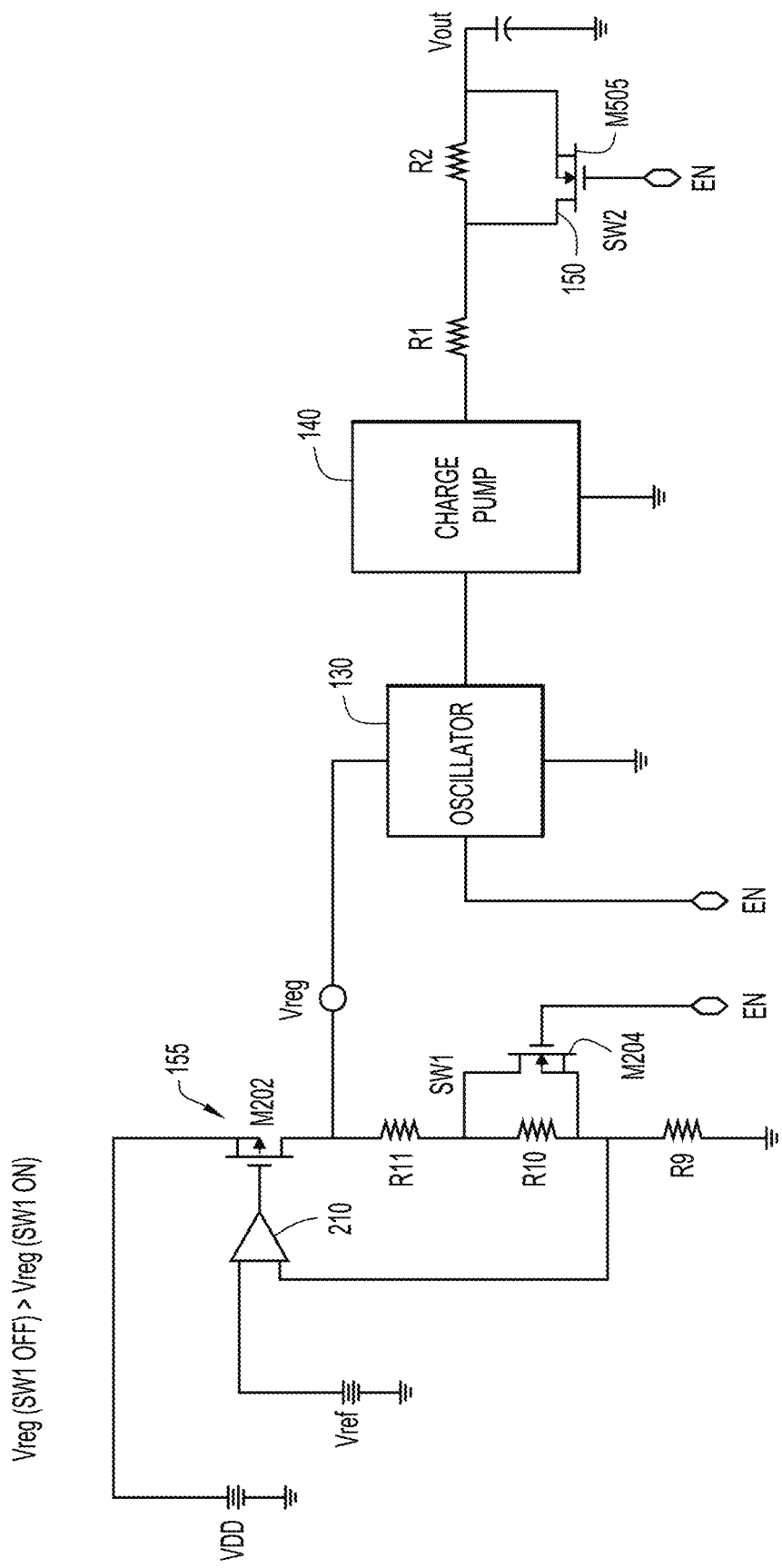
FIG. 10 depicts components of a voltage generator, with an emphasis on the application of the enable signal on a regulated voltage generator and the switchable shorting element in accordance with an embodiment of the present disclosure.

FIG. 10 depicts components of voltage generator 100, 101, with an emphasis on the application of enable signal EN on regulated voltage generator 155 and switchable shorting element 150. As indicated in the figure, with SW1 (M204) off, i.e., with the application of enable signal EN, Vreg is higher, than when SW1 (M204) is on. SW2 (M505) also has an impact on the operation of voltage generator 100, 101.

These impacts are depicted in the graphs of FIGS. 11A-C and FIGS. 12A-C.

Figure 11A:
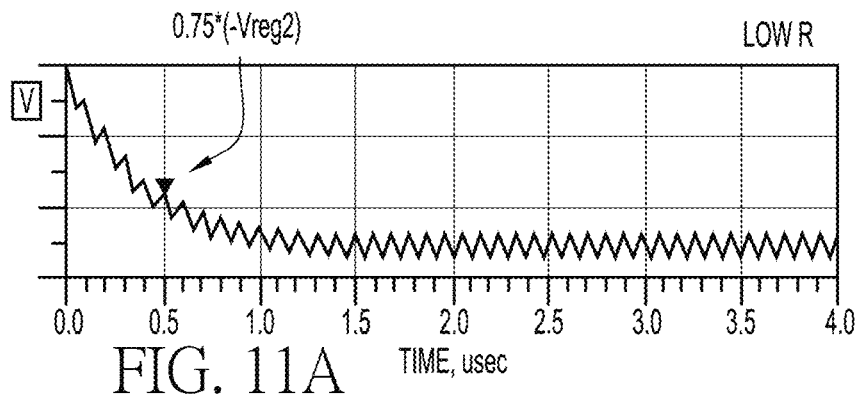
FIGS. 11A-C and FIGS. 12A-C are graphs of a voltage generator output voltage under different states of switches shown in FIG. 10 in accordance with an embodiment of the present disclosure.

Specifically, FIG. 11A is a plot of Vout when SW1 and SW2 are both always on.

Figure 11B:
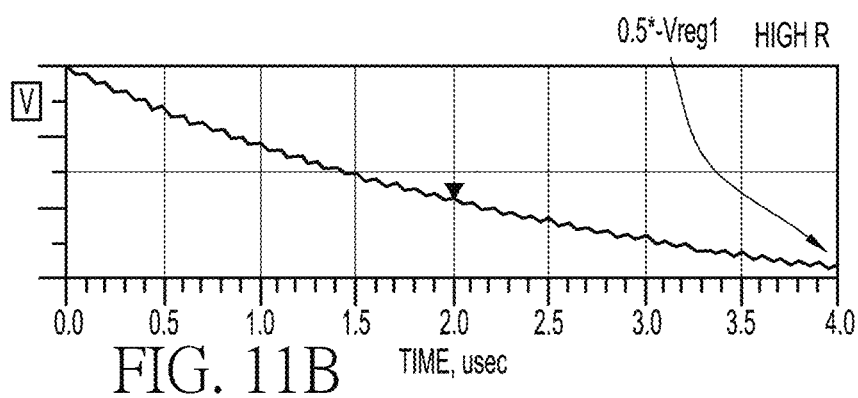

FIG. 11B is a plot of Vout when SW1 is always on, and SW2 is always off.

Figure 11C:
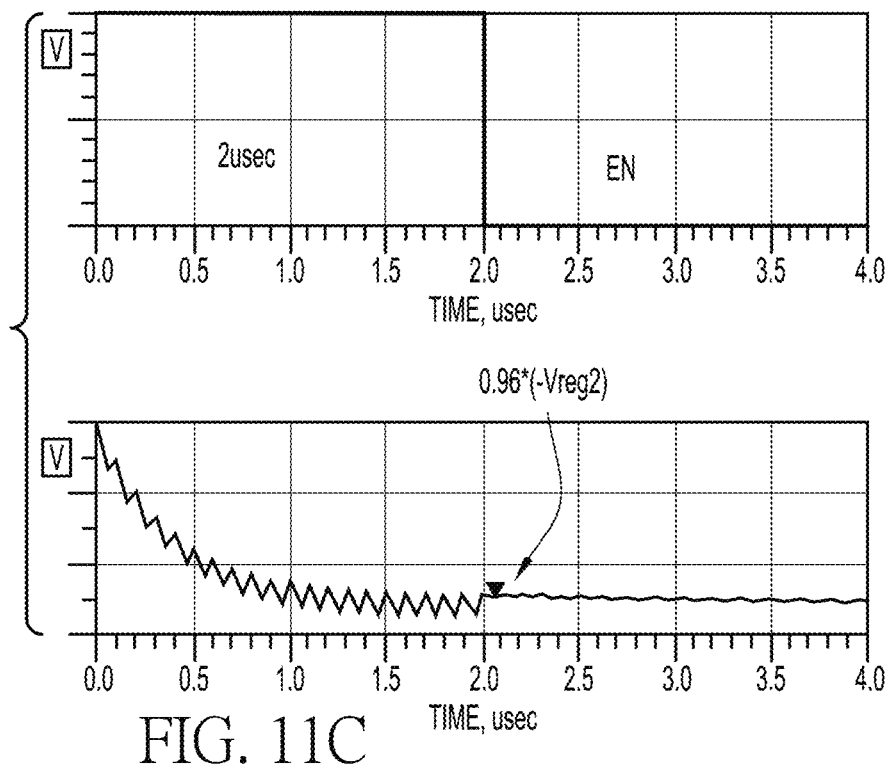

FIG. 11C shows a plot when SW1 is always on, and SW2 is on only for 2 μsec, i.e., the time period of enable signal EN.

Figure 12A:
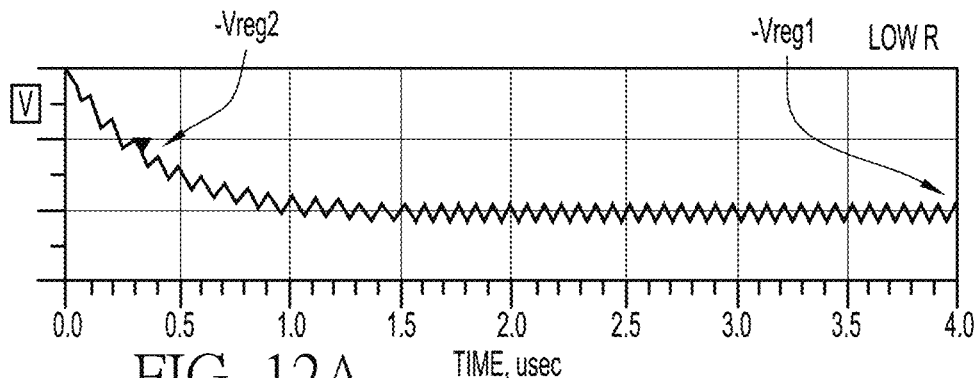

FIG. 12A is a plot of when SW1 is always off and SW2 is always on.

Figure 12B:
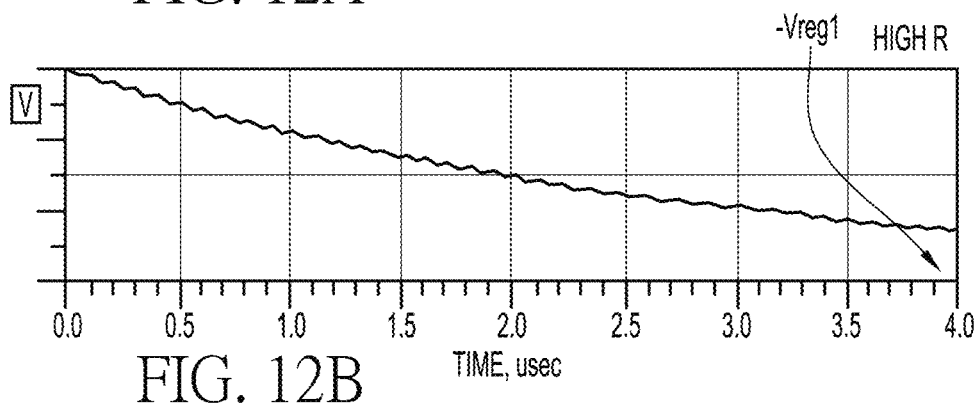

FIG. 12B is a plot of when SW1 is always off, and SW2 is always off.

Figure 12C:
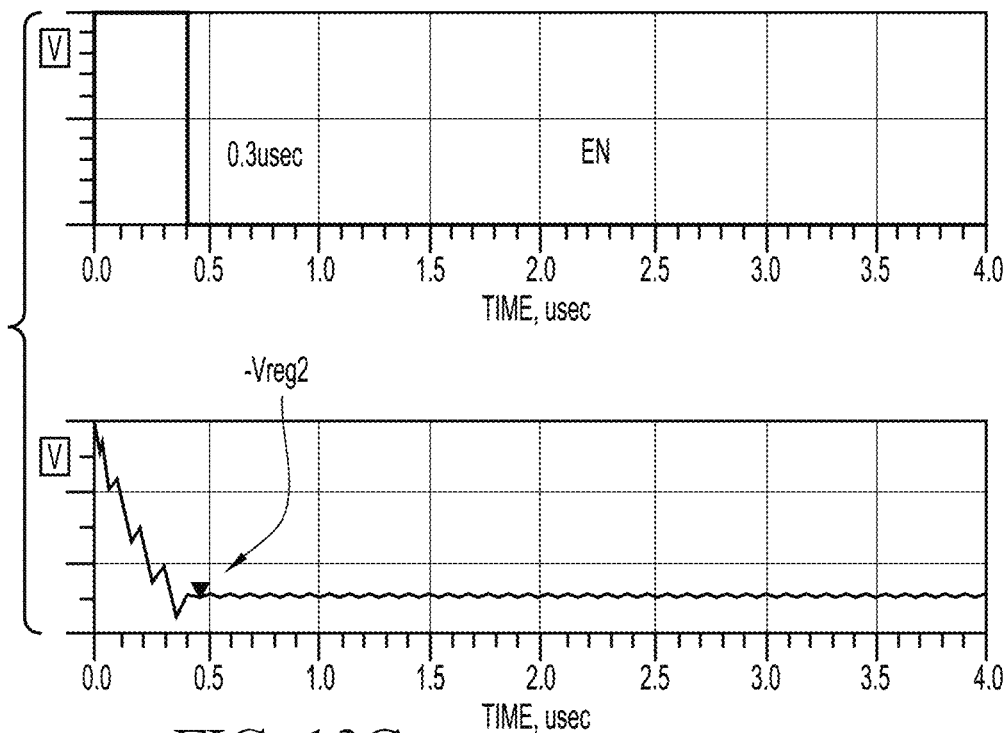

FIG. 12C is a plot of SW1 being off only for approximately 0.3 μsec and SW2 is on only for approximately 0.3 μsec.

Figure 13:
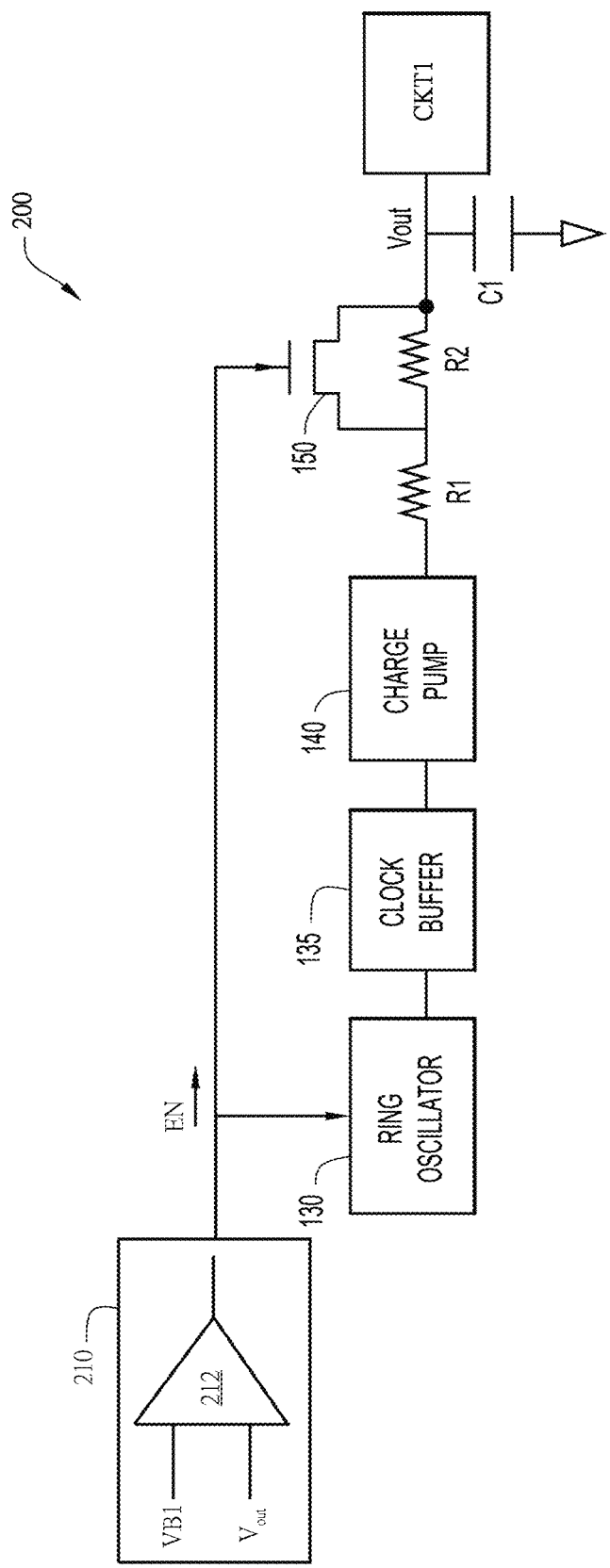
FIG. 13 depicts a voltage generator according to another embodiment of the present invention.

FIG. 13 shows a voltage generator 200 according to another embodiment of the present invention. In some embodiments, the voltage generator 200 can supply the driving voltage Vout to a circuit CKT1.

The voltage generators 100 and 200 have similar structures and can be operated with similar principles; however, the voltage generator 200 includes a driving controller 210. The driving controller 210 is coupled to the oscillator 130, and can generate the enable signal EN to adjust the operation frequency of the oscillator 130. For example, the driving controller 210 can control the operation frequency of the oscillator 130 to be faster during a transition period of the circuit CKT1.

In some embodiments, the circuit CKT1 can be an RF switch, such as the RF switch 900 shown in FIG. 9, and the driving voltage Vout can be used for driving the switch via the smoothing capacitor C1. Also, the oscillator 130 can have the same structures as shown in FIG. 1A, FIG. 1B, and FIG. 2.

In some embodiments, the driving controller 210 can generate the enable signal EN according to the driving voltage Vout. For example, when the driving voltage Vout is within a predetermined region (e.q. 2V>Vout>0V), the driving controller 210 will issue the enable signal EN to cause the oscillator 130 to operate at a first frequency. However, when the driving voltage Vout is beyond the predetermined region (e.q. Vout>2), the driving controller 210 will stop issuing the enable signal EN to cause the oscillator 130 to operate at a second frequency lower than the first frequency.

That is, when the driving voltage Vout is within the predetermined region, the driving controller 210 can control the oscillator 130 to operate at a higher frequency so that the driving voltage Vout can reach the desired level (e.q. 3V) faster.

In some embodiments, the voltage generator 200 can also include the resistor R2 and the shorting element 150 as the voltage generator 100, and the driving controller 210 can also turn on the shorting element 150 when the driving voltage Vout is within the predetermined region, thereby adjusting the RC constant and allowing the driving voltage Vout to reach the desired level even faster. Similarly, the resistor R1 shown in FIGS. 1A and 5B may also be added to the voltage generator 200.

Furthermore, the smoothing capacitor C1 can be coupled between the second terminal of the resistor R2 and a reference terminal. The reference terminal can be, for example, but not limited to, the voltage terminal providing the ground voltage.

In FIG. 13, the driving voltage Vout is a positive voltage. In this case, the driving controller 210 can include a comparator 212 for generating the enable signal EN by comparing the driving voltage Vout with a reference voltage VB1. The comparator 212 can issue the enable signal EN of a high voltage when the driving voltage Vout is smaller than the reference voltage VB1. In some embodiments, the comparator 212 can be a hysteresis comparator so that the enable signal EN could be glitch-free.

However, in some embodiments, the RF switch may be driven by a negative voltage. In this case, for example, when the driving voltage Vout is within a predetermined region (e.q. 0V>Vout>−2V), the enable signal EN may be issued to cause the oscillator 130 to operate at a higher frequency. However, when the driving voltage Vout is beyond the predetermined region (e.q. −2V>Vout), the oscillator 130 can be controlled to operate at a lower frequency.

Figure 14:
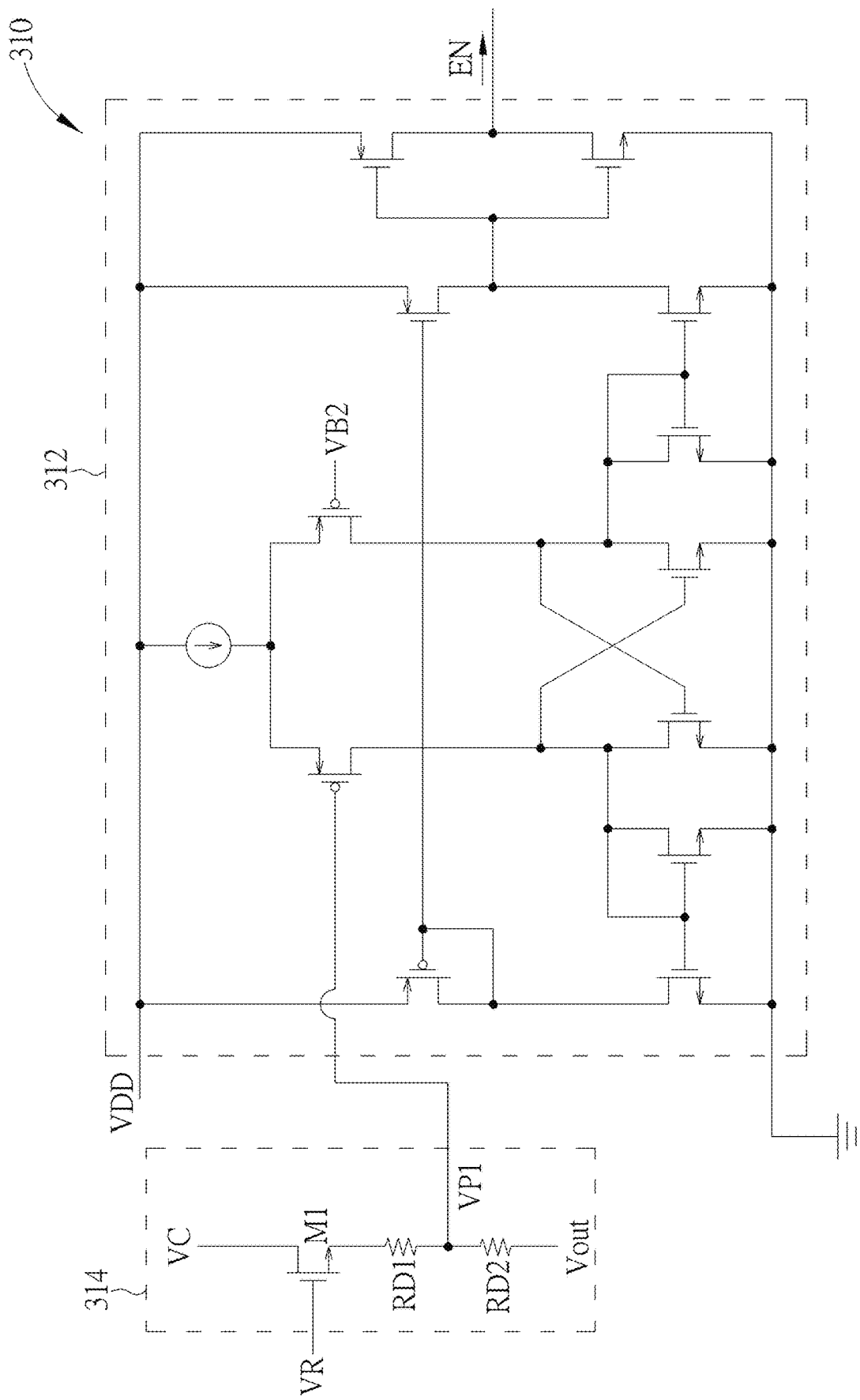
FIG. 14 depicts a driving controller according to another embodiment of the present invention.

Also, since the driving voltage Vout is a negative voltage, the driving controller may require a voltage combiner to adjust the comparison voltage for the comparator. FIG. 14 shows a driving controller 310 according to another embodiment of the present invention.

The driving controller 310 includes a comparator 312 and a voltage combiner 314. The voltage combiner 314 can receive the driving voltage Vout and shift the driving voltage Vout according to the combining voltage VR to generate a positive comparing voltage VP1. The comparator 312 is coupled to the voltage combiner 314, and can generate the enable signal EN by comparing the positive comparing voltage VP1 with a reference voltage VB2. That is, with the combiner 314, the comparator 312 can compare two positive voltages, thereby simplifying the design of the comparator 312.

In FIG. 14, the voltage combiner 314 includes a transistor M1, and voltage division resistors RD1 and RD2. The transistor M1 has a first terminal for receiving the supply voltage VC, a second terminal, and a control terminal for receiving the combining voltage VR. The combining voltage VR is a positive reference voltage for shifting the driving voltage Vout from negative to positive.

The voltage division resistor RD1 has a first terminal coupled to the second terminal of the transistor M1, and a second terminal for outputting the positive comparing voltage VP1. The second voltage division resistor RD2 has a first terminal coupled to the second terminal of the first voltage division resistor RD1, and a second terminal for receiving the driving voltage Vout. By selecting the resistance values of the voltage division resistors RD1 and RD2 properly, the voltage division resistors RD1 and RD2 can provide the positive comparing voltage VP1 between the combining voltage VR and the negative driving voltage Vout. The positive comparing voltage VP1 could be expressed by as following.

$$VP1 = \frac{(VR - VGS - Vout)}{(RD1 + RD2)} \times RD2 + Vout$$

Wherein VGS is the gate-source threshold voltage of the transistor M1.

In FIG. 14, the transistor M1 can be used to buffer the combining voltage VR so that the driving voltage Vout could have better driving capability. However in some other embodiments, the transistor M1 can be omitted, and the first terminal of the voltage division resistor RD1 can receive the combining voltage VR directly according to the system requirement.

Furthermore, the comparator 312 shown in FIG. 14 is a hysteresis comparator; however, in some other embodiments, the comparator 312 may also be implemented by comparators with other structures or of different types.

Figure 15:
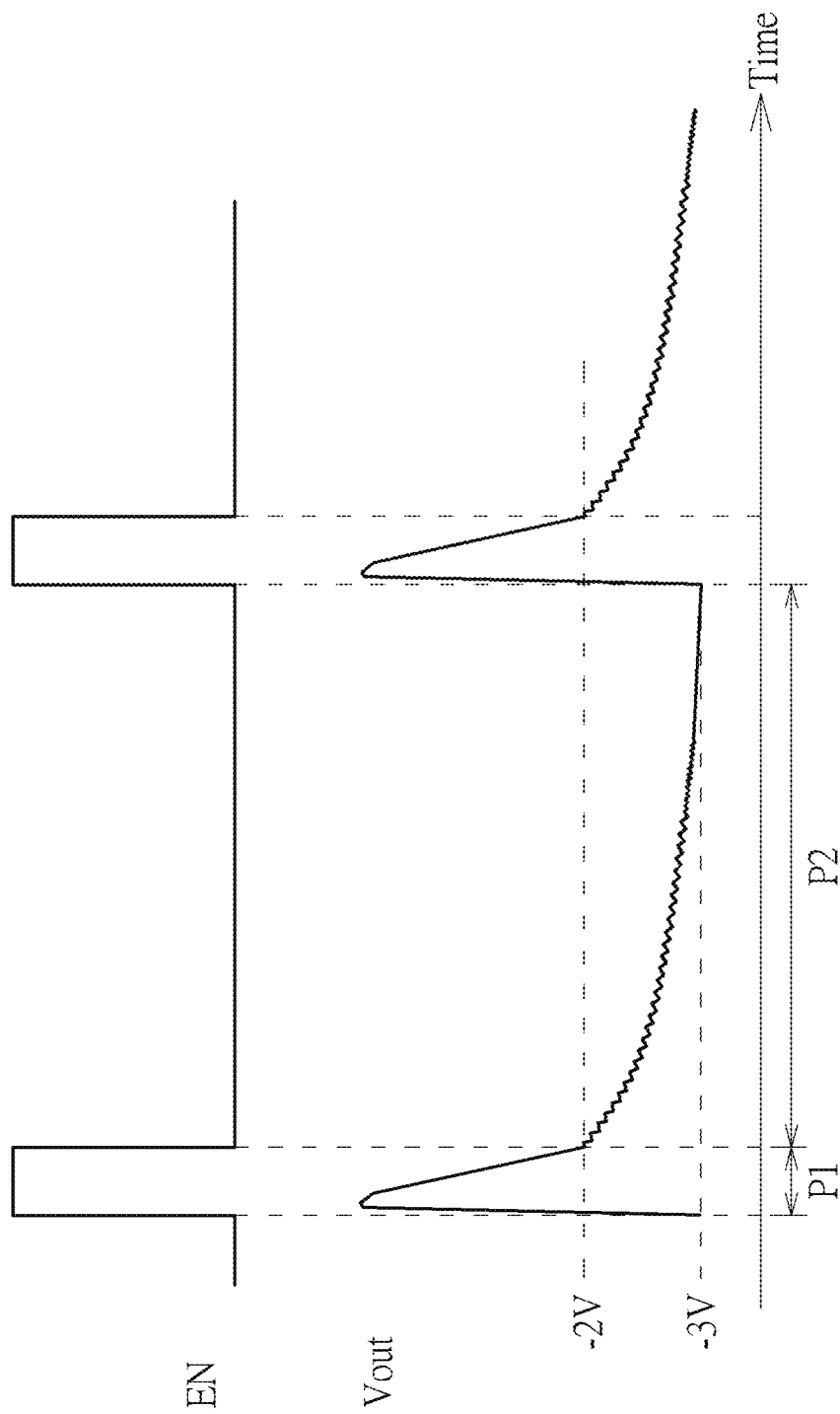
FIG. 15 shows the waveforms of the enable signal and the driving voltage according to the driving controller in FIG. 14 in one embodiment of the present invention.

FIG. 15 shows the waveforms of the enable signal EN and the driving voltage Vout according to the driving controller 310 in one embodiment of the present invention. In FIG. 15, the target level of the driving voltage Vout is −3V. In this case, during the period P1, before the driving voltage Vout reaches the predetermined level, for example, −2V, the driving controller 310 can generate the enable signal EN at a high voltage level to increase the charging speed of the driving voltage Vout. However, during the period P2, after the driving voltage Vout reaches the predetermined level (−2V), the driving controller 310 will stop generating the high voltage enable signal EN. Therefore, the operation frequency of the oscillator 130 can be decreased, and the charging speed of the driving voltage Vout will also slow down. Consequently, the driving voltage Vout can reach the target level (−3V) smoothly, and the power consumption and the noise came from the oscillator 130 could be reduced.

In summary, the voltage generator provided by the embodiments of the present invention can provide the driving voltage to the external circuit, and adjust the operation frequency of the oscillator to improve the switching performance during the transition of the external circuit and/or according to the level of the driving voltage.

While the disclosure has been described in terms of what is presently considered to be the most practical and preferred embodiments, it is to be understood that the disclosure need not to be limited to the above embodiments. On the contrary, it is intended to cover various modifications and similar arrangements included within the spirit and scope of the appended claims which are to be accorded with the broadest interpretation so as to encompass all such modifications and similar structures.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A voltage generator, comprising:
   an oscillator having an output;
   a charge pump having an input and an output, the input of the charge pump being coupled to the output of the oscillator;
   a smoothing capacitor coupled to the output of the charge pump; and
   a driving controller coupled to the oscillator, and configured to generate an enable signal to adjust an operation frequency of the oscillator;
   wherein:
   the voltage generator is configured to supply a driving voltage to a switch for driving the switch via the smoothing capacitor; and
   the driving controller comprises a comparator configured to generate the enable signal by comparing a reference voltage with a comparing voltage related to the driving voltage.

2. The voltage generator of claim 1, wherein:
   when the driving voltage is within a predetermined region, the driving controller issues the enable signal to cause the oscillator to operate at a first frequency; and
   when the driving voltage is beyond the predetermined region, the driving controller stops issuing the enable signal to cause the oscillator to operate at a second frequency lower than the first frequency.

3. The voltage generator of claim 2, further comprising:
   a resistor having a first terminal coupled to the charge pump and a second terminal coupled to the smoothing capacitor; and
   a shorting element coupled in parallel with the resistor, and configured to cause the resistor to be at least partially bypassed when turned on;
   wherein the driving controller is further configured to turn on the shorting element when the driving voltage is within the predetermined region.

4. The voltage generator of claim 3, further comprising an additional resistor coupled between the charge pump and the resistor.

5. The voltage generator of claim 3, further comprising an additional resistor coupled between the output of the charge pump and the shorting element.

6. The voltage generator of claim 3, wherein the smoothing capacitor is coupled between the second terminal of the resistor and a reference terminal.

7. The voltage generator of claim 1, wherein the driving voltage is a negative voltage, and the driving controller comprises:
   a voltage combiner coupled to the comparator and configured to receive the driving voltage and shift the driving voltage according to a combining voltage to generate the comparing voltage, wherein the comparing voltage is a positive voltage.

8. The voltage generator of claim 7, wherein the voltage combiner comprises:
   a first transistor having a first terminal configured to receive a supply voltage, a second terminal, and a control terminal configured to receive the combining voltage;
   a first voltage division resistor having a first terminal coupled to the second terminal of the first transistor, and a second terminal configured to output the positive comparing voltage; and
   a second voltage division resistor having a first terminal coupled to the second terminal of the first voltage division resistor, and a second terminal configured to receive the driving voltage.

9. The voltage generator of claim 7, wherein the voltage combiner comprises:
   a first voltage division resistor having a first terminal configured to receive the combining voltage, and a second terminal configured to output the positive comparing voltage; and
   a second voltage division resistor having a first terminal coupled to the second terminal of the first voltage division resistor, and a second terminal configured to receive the driving voltage.

10. The voltage generator of claim 7, wherein the comparator is a hysteresis comparator.

11. The voltage generator of claim 2, wherein the driving voltage is a positive voltage, and the comparing voltage is equal to the driving voltage.

12. The voltage generator of claim 11, wherein the comparator is a hysteresis comparator.

13. The voltage generator of claim 1, wherein:
    the oscillator comprises a second transistor and a third transistor;
    the second transistor is turned on for enabling a first inverter of the oscillator in a first state, and the third transistor is turned on for enabling a second inverter of the oscillator in a second state;
    the first state is enabled by the enable signal; and
    the smoothing capacitor is charged more quickly in the first state than in the second state.

14. The voltage generator of claim 13, wherein a size of the first inverter is smaller than a size of the second inverter.

15. The voltage generator of claim 1, wherein the switch comprises a radio frequency (RF) switch.

16. A voltage generator, comprising:
    an oscillator having an output;
    a charge pump having an input and an output, the input of the charge pump being coupled to the output of the oscillator;
    a smoothing capacitor coupled to the output of the charge pump; and
    a driving controller coupled to the oscillator, and configured to generate an enable signal to adjust an operation frequency of the oscillator;
    wherein:
    the voltage generator is configured to supply a driving voltage to a RF switch for driving the switch via the smoothing capacitor;
    during a switching period of the RF switch, the driving controller generates the enable signal according to the driving voltage so that the operation frequency of the oscillator is controlled to be faster; and
    the driving controller comprises a comparator configured to generate the enable signal by comparing a reference voltage with a comparing voltage related to the driving voltage.

17. The voltage generator of claim 16, wherein the driving voltage is a negative voltage, and the driving controller comprises:
    a voltage combiner coupled to the comparator and configured to receive the driving voltage and shift the driving voltage according to a combining voltage to generate the comparing voltage, wherein the comparing voltage is a positive voltage.

18. A voltage generator, comprising:
an oscillator having an output;
a charge pump having an input and an output, the input of the charge pump being coupled to the output of the oscillator;
a smoothing capacitor coupled to the output of the charge pump; and
a driving controller coupled to the oscillator, and configured to generate an enable signal to adjust an operation frequency of the oscillator;
wherein:
the voltage generator is configured to supply a driving voltage to a circuit via the smoothing capacitor; and
the driving controller comprises a comparator configured to generate the enable signal by comparing a reference voltage with a comparing voltage related to the driving voltage.

19. The voltage generator of claim 18, wherein the driving controller generates the enable signal according to the driving voltage during a transition period of the circuit so that the operation frequency of the oscillator is controlled to be faster.

20. The voltage generator of claim 18, wherein the driving voltage is a negative voltage, and the driving controller comprises:
a voltage combiner coupled to the comparator and configured to receive the driving voltage and shift the driving voltage according to a combining voltage to generate the comparing voltage, wherein the comparing voltage is a positive voltage.

* * * * *